United States Patent
Tang et al.

(10) Patent No.: US 10,707,674 B2
(45) Date of Patent: Jul. 7, 2020

(54) DIRECT CURRENT CIRCUIT BREAKER AND ITS IMPLEMENTATION

(71) Applicants: STATE GRID CORPORATION OF CHINA, Beijing (CN); STATE GRID SMART GRID RESEARCH INSTITUTE, Beijing (CN); CHINA ELECTRIC POWER RESEARCH INSTITUTE, Beijing (CN); NORTH CHINA GRID COMPANY LIMITED, Beijing (CN)

(72) Inventors: Guangfu Tang, Beijing (CN); Chong Gao, Beijing (CN); Xiang Luo, Beijing (CN); Xiaoguang Wei, Beijing (CN); Yufeng Qiu, Beijing (CN); Junzheng Cao, Beijing (CN)

(73) Assignee: STATE GRID COOPERATION OF CHINA, CO., LTD., Beijing (CN)

( * ) Notice: Subject to any disclaimer, the term of this patent is extended or adjusted under 35 U.S.C. 154(b) by 142 days.

(21) Appl. No.: 14/771,105

(22) PCT Filed: Dec. 3, 2013

(86) PCT No.: PCT/CN2013/088423
§ 371 (c)(1),
(2) Date: Aug. 27, 2015

(87) PCT Pub. No.: WO2014/131298
PCT Pub. Date: Sep. 4, 2014

(65) Prior Publication Data
US 2016/0006236 A1    Jan. 7, 2016

(30) Foreign Application Priority Data

Feb. 27, 2013  (CN) .......................... 2013 1 0061175

(51) Int. Cl.
*H02H 3/38*  (2006.01)
*H01H 33/59* (2006.01)
(Continued)

(52) U.S. Cl.
CPC ............ *H02H 3/38* (2013.01); *H01H 33/596* (2013.01); *H02H 9/02* (2013.01); *H01H 9/542* (2013.01);
(Continued)

(58) Field of Classification Search
USPC ....................................... 361/2–13
See application file for complete search history.

(56) References Cited

U.S. PATENT DOCUMENTS 5,650,901 A *  7/1997  Yamamoto ............. H01H 9/542
                                                   361/100
6,535,366 B1 *  3/2003  Frohlich ................ H01H 3/222
                                                   361/10

(Continued)

FOREIGN PATENT DOCUMENTS

CN    102222874 A    10/2011
CN    202276128 U    6/2012
(Continued)

*Primary Examiner* — Danny Nguyen
(74) *Attorney, Agent, or Firm* — Platinum Intellectual Property LLP (57) ABSTRACT

The present invention provides a direct current circuit breaker and its implementation method, which includes a cutout circuit, a commutation circuit and a energy absorption circuit connected in parallel. Through using power semiconductor switch module to cut off the current, it will have a quickly action, without generating electric arc, while the modular construction also reduces the consistency requirements of the power electronic component.

11 Claims, 10 Drawing Sheets

(51) Int. Cl.
*H02H 9/02* (2006.01)
*H02H 7/26* (2006.01)
*H02J 1/00* (2006.01)
*H01H 9/54* (2006.01)
*H01H 83/20* (2006.01)
*H02H 3/08* (2006.01)

(52) U.S. Cl.
CPC ............... *H01H 83/20* (2013.01); *H02H 3/08* (2013.01); *H02H 7/268* (2013.01); *H02J 1/00* (2013.01)

(56) References Cited

U.S. PATENT DOCUMENTS

| | | | |
|---|---|---|---|
| 2012/0299393 A1* | 11/2012 | Hafner | H01H 9/542 307/113 |
| 2015/0002977 A1* | 1/2015 | Dupraz | H01H 9/542 361/115 |
| 2015/0022928 A1* | 1/2015 | Mohaddes Khorassani | H02H 3/087 361/93.7 |

FOREIGN PATENT DOCUMENTS

| | | |
|---|---|---|
| CN | 103280763 A | 9/2013 |
| JP | 2005-19106 A | 1/2005 |

\* cited by examiner

DIRECT CURRENT CIRCUIT BREAKER AND ITS IMPLEMENTATION

RELATED APPLICATIONS

This application is a United States National Stage Application filed under 35 U.S.C. 371 of PCT Patent Application Serial No. PCT/CN2013/088423, filed Dec. 3, 2013, which claims Chinese Patent Application Serial No. CN 201210279738.7, filed Feb. 27, 2013, the disclosure of all of which are hereby incorporated by reference in their entirety.

FIELD OF THE INVENTION

The invention relates to a power electronic technology, more particularly, to a direct current circuit breaker and its implementation process.

BACKGROUND OF THE INVENTION

As the technology based on the multi terminal flexible direct current of the VSC and DC power grid comes to be used, the quick direct current circuit breaker becomes the key device to ensure the system running security, stability and reliability. In the exchange system, the alternating current has two natural zero-crossing points in a period, the alternating current circuit breaker just uses the current natural zero-crossing point to cut off the current, meanwhile the direct current has no natural zero-crossing point, therefor, the cut off of the direct current is far more different than the cut off of the alternating current.

Generally speaking, there are two method to cut off the direct current, one is based on the general alternating mechanical switch, superimposing increasing oscillation current on direct current of the arcing gap by adding auxiliary circuit, cutting off the circuit by the current passes through zero, and the mechanical switch breaker is manufactured by this principle, it cannot meet the demands of the multi terminal flexible direct current transmission system on the breaking time; Another is that a high power cut-off power electronic device is used to break the direct current directly, although the solid-state breaker manufactured by this principle can meet the demands of the multi terminal flexible direct current transmission system on the breaking time, it has an oversize loss and poor economic nature when it is turned on normally.

SUMMARY OF THE INVENTION

Aiming at the disadvantages and limitations of existing technology, the present invention provides a direct current circuit breaker and its implementation process, which realizes the effect of cutting out the direct current by turn-off power electronic devices, it has no arc cutting and fast speed.

The present invention is realized by the technical scheme below:

A direct current circuit breaker, said breaker includes the cutout circuit, the commutation circuit and the energy absorption circuit connected in parallel, what is improved is: Said cutout circuit includes cutout inductance and cutout unit connected in series; Said commutation circuit includes commutation inductance, commutation unit and mechanical switch connected in series.

Wherein, said cutout unit and commutation unit all include the half/full bridge structure converter;

The number of converters in the cutout unit is greater than it in the commutation unit, said commutation unit has a smaller on-resistance compared to said cutout unit.

Wherein, said full bridge structure converter includes the capacitor and H bridge structure power semiconductor switch module; Said H bridge structure power semiconductor switch module includes four power semiconductor switch modules; Wherein each two in series together and constitute a branch, two branches parallel, and extract the intermediate point of the two branches as the input or output end; The number of said capacitor is at least one, and it connects with the power semiconductor switch module branch after a series.

Wherein, said H bridge structure power semiconductor switch module includes four diodes and at least one power semiconductor switch; Wherein each two diodes are in series to consist a branch, two branches parallel, and the intermediate point of the two branches is extracted as the input end and output end; Wherein the power semiconductor switch is in parallel with the capacitor and in parallel with said branch made up by the diodes. Wherein, said half bridge structure converter includes two power semiconductor switch modules and at least one capacitor; Said two power semiconductor switch modules, after in series together, are in parallel with the capacitor; The intermediate point between one end of the capacitor and power semiconductor switch module connected in series is as the input or output end. Wherein, said power semiconductor switch module includes power semiconductor switch parallel opposite and fly back diode.

Wherein, the number of said mechanical switch is at least one. Wherein, said energy absorption circuit includes lightning arrester and slide rheostat.

A limit current device consists of said direct current breaker, of which the improvement is that it comprises at least said two current breakers connected in series, a branch in series made by said direct current breaker is connected with a current path of transmission or distribution line. Said current limiting device suits for handling a certain number of said direct current circuit breaker when the current beyond the current limit in the current path so that it makes the current of said mechanical switch and commutation unit of said at least two direct current circuit breakers reverse to the energy absorption circuit. Wherein, the specific number is determined by the current limit level, in general, the principle to select the number is: making the current drop to or below the current limit and keeping in the reservation current value at least at a certain time period.

A limit current device comprises at least one set parallel interrupt unit and energy absorption circuit, and mechanical switch and cutout unit in series; Each set parallel interrupt unit and the energy absorption circuit is in series;

When the current flowing beyond the current limit in the current path, handling said mechanical switch, and the parallel cutout unit and energy absorption circuit, and it make the current flowed through the mechanical switch and the commutation unit reverse to the parallel cutout unit and the energy absorption circuit.

An application method of the direct current circuit breaker improved is that, said method includes the following steps:

A, The circuit controls the converter of the commutation unit is turned on under control, the mechanical switch is closed;

B, The current value of every path is tested by the control circuit, when it needs to break the direct current in the circuit, the control circuit triggers the converter of the cutout unit, if the signal from lock converter of the commutation unit is received, then the converter of the commutation unit is locked; The capacitors of the commutation inductance and commutation unit form the oscillation, so that it moves the current into the cutout circuit; C, Turning off said mechanical switch, and making it have enough fracture length; D, If the signal from the lock converter of the cutout unit is received, then the converter of the cutout unit is locked, to switch the current to the cutout unit capacitor, the current in the circuit charges the capacitor in the cutout unit, the capacitor voltage starts to rise;

E, When the capacitor voltage rises to the energy absorption circuit action voltage, and switches the current into the energy absorption circuit.

If the current value of every path tested in step B exceeds the first current limit, the control circuit sends the signal to turn off the converter of said commutation unit;

The extreme value of the first current is greater than or equal to the rated current of the circuit connect to the convertor station.

Wherein, step C turn off said mechanical switch after the first period time form locking said commutation unit.

Wherein, step C controls circuit judge current when the current switches to cutout circuit form commutation circuit, the control circuit turns off said mechanical switch.

Wherein, under the condition of said commutation unit converter locking or not receiving the cutout unit converter locking signal on the second period time form the time turning off the mechanical switch.

Wherein, after cutting off the high speed mechanical switch and unlocking said commutation unit converter, it still receiving or receiving again the turn off signal of the commutation unit converter, after that, turn off the high speed mechanical switch, and after that since receiving the turn off signal of said cutout unit converter, then it turns off the cutout unit converter.

The application method used for the first current limiting device is that, when said current in the current path exceeds the limit determined by the applied line, the first specific number of said at least two devices is handled, and the corresponding cutout unit converter form this is locked to make the current reverse to said corresponding energy absorption circuit.

The application method for using the second current limiting device is that, when the current exceeds the current limit in said current path, the commutation unit converter is locked, the mechanical switch is cut off, and then the first specific number said cutout unit converters is locked, thus to make the current reverse, through said high speed mechanical switch and said commutation unit converter, to the first specific number cutout unit converters, and then converse to the corresponding energy absorption circuit.

Wherein, based on the current limit level said first specific number is determined.

Wherein, monitoring the heat of the energy absorption circuit which is corresponding to the locking cutout unit converter, when the heat exceeds the first energy limit, the latching cutout unit converter is unlocked, and the same first specific number cutout unit converters of the first or the second current limiting arrangement is locked.

Wherein, when the current in said current path is in blackout, operating the rest devices of said first current limiting device or the rest cutout unit converter of the second current limiting device respectively, it makes said current in the current path converse to the whole energy absorption circuits of said corresponding current limiting device.

Wherein, if there is at least one arrester in the energy absorption circuits or the heat of the slipping resistor exceeding the second energy limit, then said current in the current path is cut off.

Wherein, if the current in current path exceeds the second current limit, then said current of the current path is cut off, wherein said second current limit is the maximum current which said current limiting device can be breaking.

Compared with the most related prior art, the advantages of the present invention are described as below:

1, The present invention provides circuit topology of the direct current circuit breaker, wherein the normal breakover current is in charge of the converter circuit, the commutation unit in the converter circuit has less series levels, so that the on-state consumption is low when the direct current circuit breaker is turned on.

2, The present invention provides circuit topology of the direct current circuit breaker, as the high speed mechanical switch is breaking without current, the speed of the switch breaking is greatly expedited.

3, The circuit topology of the direct current circuit breaker the present invention provides have a low on-state consumption, in series the capacitor, both have the function of limiting the current.

4, The commutation unit and the cutout unit of the direct current circuit breaker the present invention provides are in the full/half bridge structure, in which the modular construction also the consistency requirements of the power electronic component are reduced, and it is easy to realize the voltage-sharing of the power semiconductor in series.

5, In the circuit topology of the direct current circuit breaker the present invention provides, the power semiconductor switch of the cutout circuit cuts off the direct current, it has no arc cutting and fast speed.

6, The direct current circuit breaker the present invention provides can realize the bidirectional turn-on, reduce the demand for the drive circuit of power electronic device, wherein the full bridge structure also can realize shunting, reducing the power electronic device demands, reducing the cost.

7, The circuit topology of the direct current circuit breaker the present invention provides has a simple and concise structure, comprehensive function and simple control.

8, Using the control method of the present invention can ensure the breaker normal running safety, orderly and reliably.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF EMBODIMENTS

The following examples are provided to illustrate the present invention, and should not be limitative of the scope of this novel device.

The detail of the embodiments is described as below incorporated with the figures by way of cross-reference.

Figure 1:
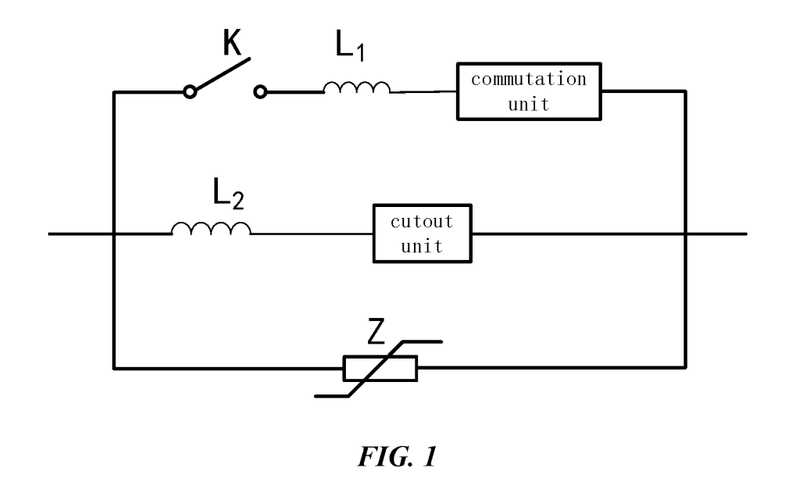
FIG. 1 is an electrical structure diagram provided by the present invention. Wherein, L is the inductor; K is the mechanical switch; Z is the arrester.

A breaker is illustrated by the present embodiment, its electrical structure shown as FIG. 1, including the cutout circuit, the commutation circuit and the energy absorption circuit connected in parallel.

The commutation circuit is used for switching the external current into cutout circuit, including commutation inductance, commutation unit and mechanical switch connected in series, turn-on the bidirectional current; The commutation unit only enduring the on-state voltage drop when the cutout switch turns on; When the high speed switch cuts off, it endures the voltage of the whole breaker. Wherein, the number of the mechanical switch is at least one, so that it can endure the higher voltage.

The cutout circuit is in charge of quickly cutting off the direct current in the path after the high speed switch cutting off, the cut-off, it can cut off the bidirectional current, wherein including cutout inductance and cutout unit connected in series.

The commutation inductance in the commutation circuit and the cutout inductance in the cutout circuit used are the normal inductance, such as air-core inductance with dozens of microhenries.

In the commutation circuit and cutout circuit, the full or half bridge structure converter is included, but number of the cutout unit is greater than it of the commutation unit, so that commutation unit has a smaller on-resistance compared to cutout unit.

Figure 2:
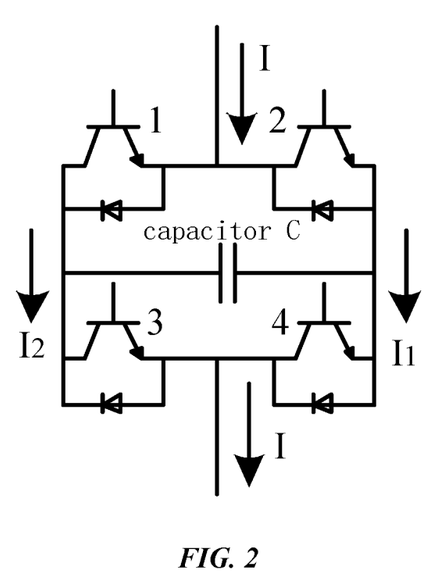
FIG. 2 is the first sample graph of the H bridge structure converter provided by the present invention. Wherein, 1, 2, 3 and 4 are the power semiconductor switches; I is the general current; I1, I2 is the branch current.
Figure 5:
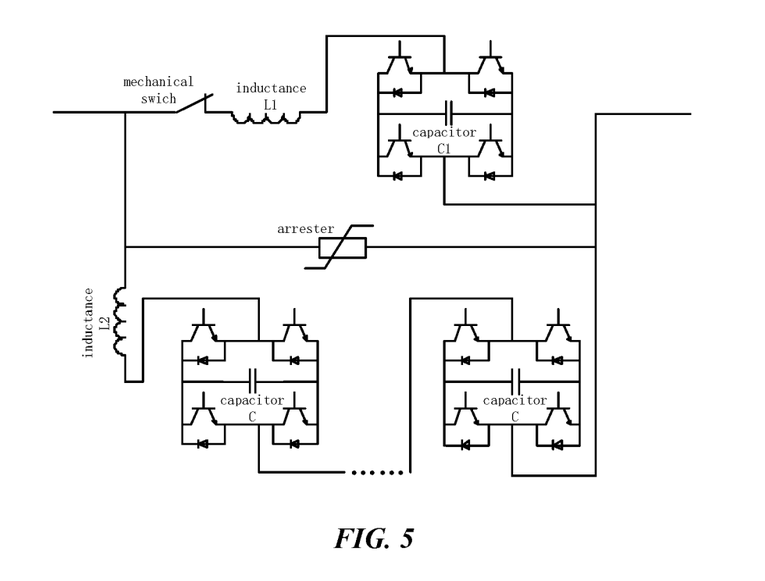
FIG. 5 is the first sample graph of the full bridge structure breaker provided by the present invention.

The full bridge structure converter includes H bridge structure power semiconductor switch module and the capacitor, as shown in FIG. 2, number of the capacitor is at least one, and it connects with the power semiconductor switch module branch after a series, wherein:

Said H bridge structure power semiconductor switch module includes four power semiconductor switch modules, wherein each two in series constitute together a branch, two branches are parallel, and the intermediate point of the two branches is extracted as the input end and output end. A commutation circuit is consisted of a full bridge structure converter in series with a commutation inductance and mechanical switch, the cutout circuit is constituted by N that is positive integer full bridge structure converters and cutout inductance in series. The breaker realized by the full bridge structure converter is shown as FIG. 5.

Figure 3:
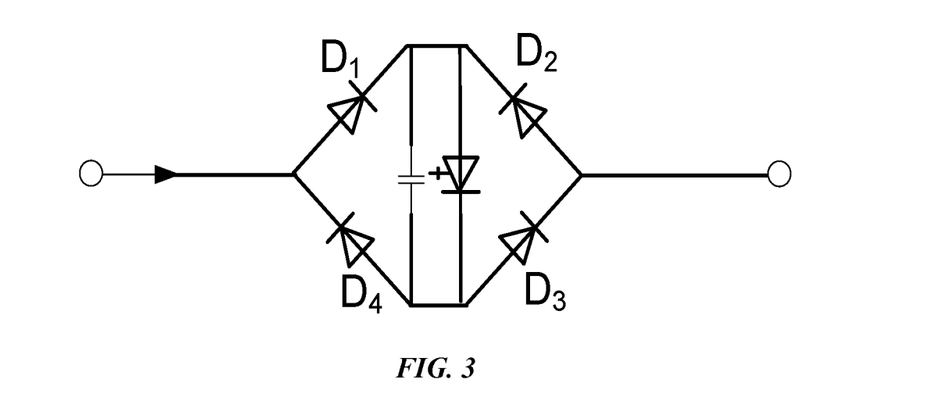
FIG. 3 is the second sample graph of the H bridge structure converter provided by the present invention.
Figure 6:
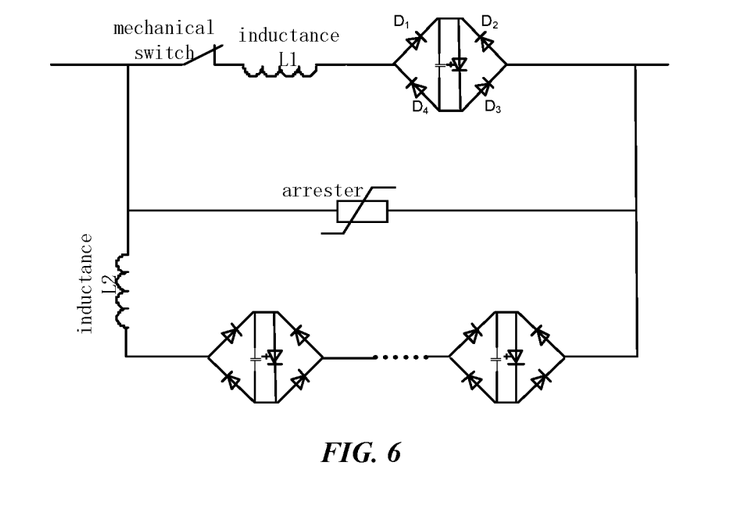
FIG. 6 is the second sample graph of the breaker which realized by the e full bridge structure provided by the present invention.

Said H bridge structure power semiconductor module also consists of four diodes and at least one power semiconductor switch. As shown in FIG. 3, each two diodes in series consist a branch, two branches are parallel, and extract the intermediate point of the two branches as the input end and output end. The power semiconductor switch is in parallel with two branches in series; A full bridge structure converter, commutation inductance and mechanical switch in series constitute the commutation circuit, N full bridge structure converters and cutout inductance are in series and constitute the cutout circuit. The breaker realized by the full bridge structure converter is shown as FIG. 6.

Figure 4:
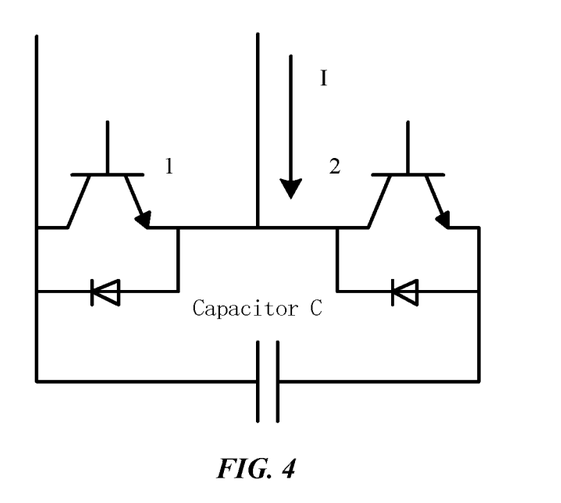
FIG. 4 is a sample graph of the half bridge structure converter provided by the present invention. Wherein, 1 and 2 are the power semiconductor switches; I is the general current.
Figure 7:
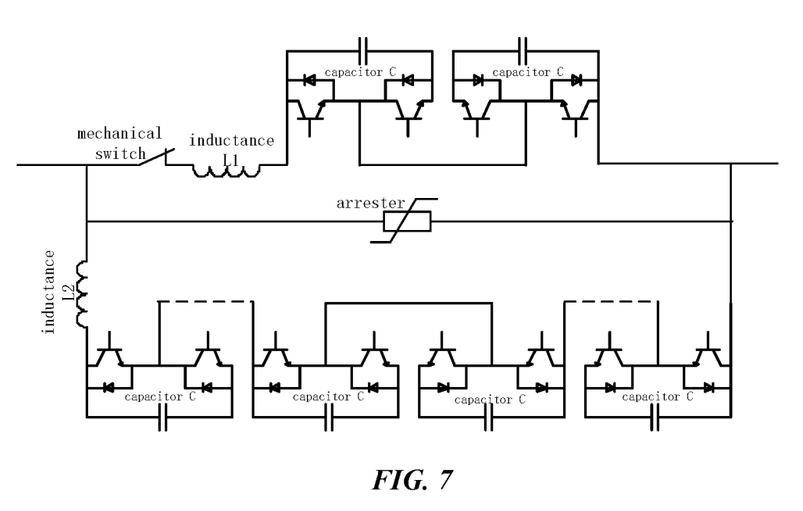
FIG. 7 is a sample graph of the breaker which realized by the e full bridge structure provided by the present invention.

Half bridge structure converter includes the capacitor and two power semiconductor module, as shown in FIG. 4; Said two power semiconductor module after in series are in parallel with the capacitor, and extract the intermediate point between one end of the capacitor and the power semiconductor module as the input end and output end. Two half bridge structure converters, commutation inductance and mechanical switch are in series and constitute the commutation circuit. N full bridge structure converters and cutout inductance in series and constitute the cutout circuit. The breaker realized by the half bridge structure converter is shown as FIG. 7.

The power semiconductor switch module in the present embodiment includes IGBT and diode parallel opposite.

The energy absorption circuit after cutting off the circuit and the direct current can absorb the energy stored by the inductance of the HVDC system, including lightning arrester and slide rheostat. While realizing by the slide rheostat, where the voltage in the system is higher, the value of resistance of the slide rheostat is less, where the voltage in the system is smaller, the value of resistance of the slide rheostat is larger.

Figure 8:
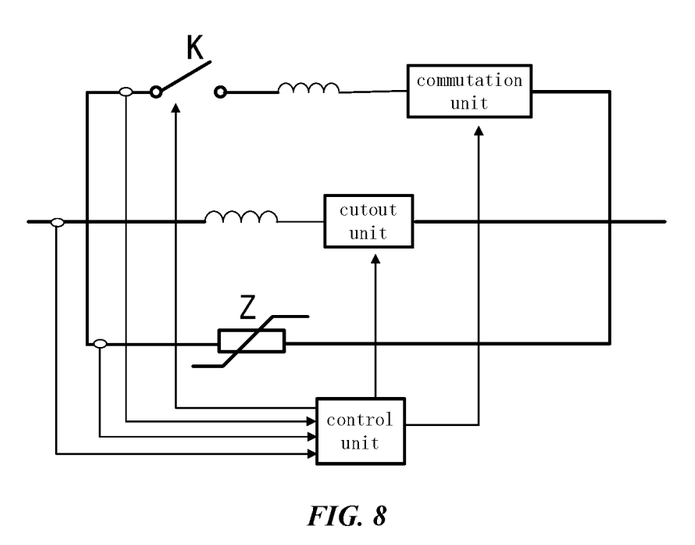
FIG. 8 is a sample graph of the breaker and the control circuit provided by the present invention.

Using the cut off method of the direct current circuit breaker of the present embodiment, adding the control circuit, shown as FIG. 8. After testing each branch and the main circuit current, the control circuit controls the turning-on and cutting off of the commutation circuit, the cutout circuit and the mechanical switch, being used to for controlling the circuit bring in and quite. It could include the processor, DSP or FPGA and others.

The steps of cut off method of the present embodiment are as follows:

A, The circuit controls the converter of the commutation unit turn on is controlled, closing the mechanical switch, wherein, generating and sending the commutation unit lock signal before generating and sending the cutout unit converter lock signal;

B, When it needs to break the direct current in the circuit, the circuit triggers the converter of the cutout unit is controlled. If the signal to lock the converter of the commutation unit is received, the converter of the commutation unit is locked; the capacitors of the commutation inductance and commutation unit form the oscillation, and the current is moved into the cutout circuit; If it exceeds the first current limit, the control circuit sends the signal to turn off the converter of said commutation unit; The extreme value of the first current is greater than or equal to the rated current of the circuit connect to the convertor station.

C, The judge current of the control circuit to judge is switched to cutout circuit form commutation circuit, the control circuit turns off said mechanical switch and make it have enough fracture length D, If the signal to lock the converter of the cutout unit is received, then the converter of the cutout unit is locked, to switch the current to the cutout unit capacitor, to make the current in the circuit charges the capacitor in the cutout unit, and the capacitor voltage get to rise;

E, When the capacitor voltage rises to the energy absorption circuit action voltage, and the current is switched into the energy absorption circuit.

Under the condition of said commutation unit converter locking or not receiving the cutout unit converter locking signal on the second period time (the period time is determined by the withstand strike current ability of the cutout unit without the cooling) form the time turning off the mechanical switch, said mechanical switch is closed again, and commutation unit is unlocked.

After it, the turn off signal of the commutation unit converter is still received or received again, firstly the commutation unit converter is turned off, after that, turn off the high speed mechanical switch is turned off, and after that since receiving the turn off signal of said cutout unit converter, and then the cutout unit converter is turned off.

Figure 9:
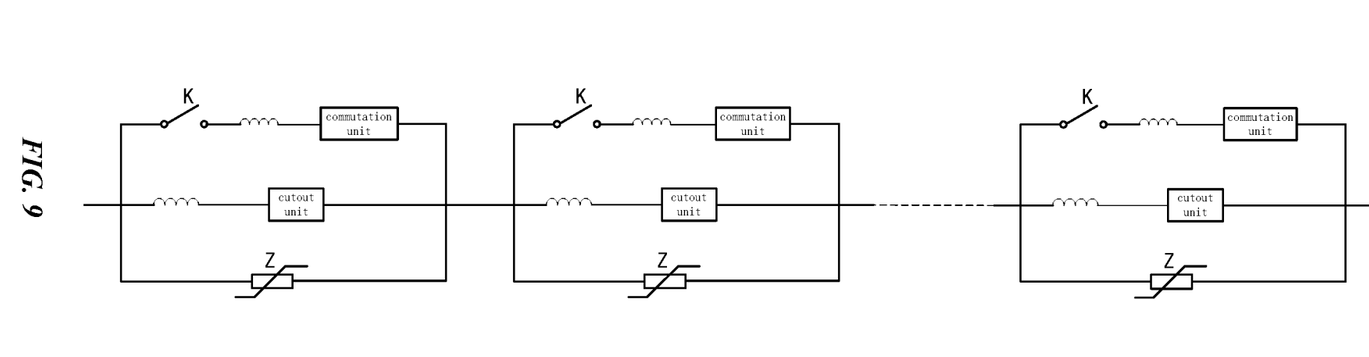
FIG. 9 is a sample graph of the first current limiting device provided by the present invention.

In the process of implementation, when the current exceeds the current limit in said current path, the first specific number of said at least two devices is handled, to make the corresponding cutout unit converter form this lock, and can make the current reverse to said corresponding energy absorption circuit, shown as FIG. 9. Or, when the current exceeds the current limit said current path, the commutation unit converter is locked, the high speed mechanical switch is cut off, and then the first specific number said cutout unit converters is locked, thus to make the current through said high speed mechanical switch and said commutation unit converter reverse to the first specific number cutout unit converters, and then to make it converse to the corresponding energy absorption circuit, shown as FIG. 10. Wherein, based on the current limit level, said first specific number is determined.

The first current limiting arrangement proposed by the present embodiment, is shown as FIG. 9, that it is in series multiple direct current breaker. Said current limiting arrangement is suit for handling a certain number of said direct current circuit breaker when the current beyond the current limit in the current path, and it make the current of said mechanical switch and commutation unit of said at least two direct current circuit breakers reverse to the energy absorption circuit.

Figure 10:
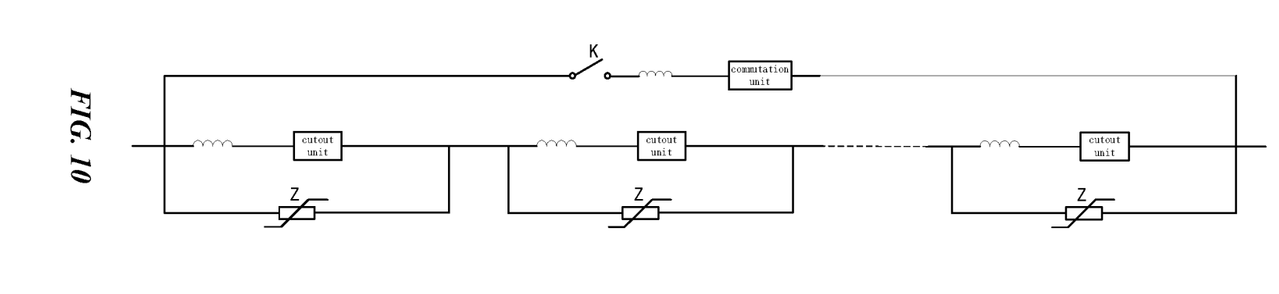
FIG. 10 is a sample graph of the second current limiting device provided by the present invention.

The second current limiting arrangement proposed by the present embodiment, is shown as FIG. 10, correspondingly its structure is changed, including at least one set parallel commutation unit and energy absorption circuit, and mechanical switch and cutout unit in series; each set parallel commutation unit is in series energy absorption circuit;

When the current is beyond the current limit in the current path, said mechanical switch, said commutation unit and the parallel cutout unit and energy absorption circuit are handled to make the current flowed through the mechanical switch and the commutation unit reverse to the cutout unit and the energy absorption circuit in series.

Monitoring the heat of the energy absorption circuit which corresponds to the locking cutout unit converter, when the heat exceeds the first energy limit, the latching cutout unit converter is unlocked, and the same first specific number cutout unit converters of the first or the second current limiting arrangement is locked.

When the current in the current path is cut off, operating the rest devices of said first current limiting arrangement or the rest cutout unit converter of the second current limiting arrangement respectively, it makes said current in the current path converse to the whole energy absorption circuits of said corresponding current limiting arrangement; If there is at least one arrester in the energy absorption circuits or the heat of the slipping resistor exceeding the second energy limit, then said current in the current path is cut off; If it of the current path is exceeding the second current limit, then said current of the current path is cut off, wherein said second current limit is the maximum current which said current limiting arrangement can be breaking.

The embodiment uses power semiconductor switch module to realize the function of commutation and cutout, achieve the effect of cost savings.

At last, in this description of the embodiments, we have detail describe the present invention according to a particular example. The detail embodiment is one example of the invention but not the only one, so the person in this field must be understand that all the alternatives and other equal and/or similar examples are all within the range of the invention and they are all consistent with the spirits of this invention, are all protected by our claims.

The invention claimed is:

1. A direct current circuit breaker, said breaker includes a cutout circuit, a commutation circuit and an energy absorption circuit connected in parallel, is characterized that, said cutout circuit includes a cutout inductance and a cutout unit connected in series; said commutation circuit includes a commutation inductance, a commutation unit and a mechanical switch connected in series, wherein a full bridge structure converter includes a capacitor and a H bridge structure power semiconductor switch module; said H bridge structure power semiconductor switch module includes four power semiconductor switch modules; each two are in series together and constitute a branch, two branches are parallel, and respectively, extract an intermediate point of the two branches as an input end and output end; and said capacitor connects to the power semiconductor switch module branch.

2. The direct current circuit breaker according to claim 1, is characterized that, said cutout unit and commutation unit all include a half/full bridge structure converter; the number of converters included in the cutout unit is greater than the number of converters in the commutation unit.

3. The direct current circuit breaker according to claim 2, is characterized that, said H bridge structure power semiconductor switch module includes four diodes and
  at least one power semiconductor switch;
  each two diodes are in series that consists a branch, two branches are parallel, and the intermediate point of the two branches is extracted as the input end or output end; the H bridge structure power semiconductor switch is connected in parallel with the capacitor.

4. The direct current circuit breaker according to claim 2, is characterized that, said half bridge structure converter includes two power semiconductor switch modules
  and at least one capacitor; said two power semiconductor switch modules are coupled in series and, parallel with the capacitor; the intermediate point between one end of the capacitor and power semiconductor switch module in series is as the input end or the output end.

5. An application method of a direct current circuit breaker, is characterized that, said method includes the steps of:
  (a) controlling, by a control circuit, a converter of a commutation unit and a mechanical switch;
  (b) testing, by the control circuit, a current value of every path, when the current value exceeds a first current limit, triggering, by the control circuit, the converter of a cutout unit if the signal to lock the converter of the commutation unit is received, then the converter of the commutation unit is locked; the capacitors of a commutation inductance and the commutation unit form the oscillation to move the current into the cutout unit; and (c) turning off said mechanical switch.

6. The application method according to claim 5, is characterized that, determining a first specific number based on the current limit level.

7. The application method according to claim 5, characterized that, monitoring a heat of the energy absorption circuit corresponding to the locking cutout unit converter.

8. The application method of claim 5, wherein when the current value exceeding the current limit in said current path, handling a first specific number of said at least two devices, and locking the corresponding cutout unit converter to make the current reverse to said corresponding energy absorption circuit.

9. The application method of the direct current circuit breaker according to claim 5, is characterized that, if step (b) exceeds a first current limit, sending the signal to turn off the converter of said commutation unit.

10. The application method of the direct current circuit breaker according to claim 5, is characterized that turning off said mechanical switch after a first period time from locking said commutation unit.

11. The application method of the direct current circuit breaker according to claim 5, is characterized that, after closing the mechanical switch and unlocking said commutation unit converter, receiving the turn off signal of the commutation unit converter.

\* \* \* \* \*